United States Patent [19]  [11] Patent Number: 4,776,261
Larson  [45] Date of Patent: Oct. 11, 1988

[54] RECIPROCATING ENGINE PISTON SEAL

[76] Inventor: John W. Larson, 23 Library La., P.O. Box 112, Sturbridge, Mass. 01566

[21] Appl. No.: 47,770

[22] Filed: May 8, 1987

[51] Int. Cl.⁴ .............................................. F01B 31/00
[52] U.S. Cl. ................................ 92/174; 92/DIG. 2; 277/34; 277/75; 277/76; 277/142
[58] Field of Search ............... 92/DIG. 2, 181 R, 182, 92/183, 184, 185, 174; 123/193 P; 277/34, 34.3, 75, 76, 142, 12, 3

[56] References Cited

U.S. PATENT DOCUMENTS

| | | | |
|---|---|---|---|
| 793,973 | 7/1904 | White | 92/184 |
| 1,867,718 | 7/1932 | Towell | 92/184 |
| 4,118,040 | 10/1978 | Chist et al. | 277/75 |
| 4,346,685 | 8/1982 | Fujikawa | 92/182 X |
| 4,455,974 | 6/1984 | Shapiro et al. | 92/183 X |
| 4,523,764 | 6/1985 | Albers et al. | 277/75 X |
| 4,632,403 | 12/1986 | Ishitani et al. | 277/75 X |

FOREIGN PATENT DOCUMENTS 545805  4/1977  U.S.S.R. ........................ 92/DIG. 2

Primary Examiner—Edward K. Look
Attorney, Agent, or Firm—Wolf, Greenfield & Sacks

[57] ABSTRACT

Apparatus for sealing the gap between a piston and engine cyinder wall of either a reciprocating engine or a reciprocating compressor. The apparatus includes a plurality of functionally-identical, gas-bearing-supported seal blocks that locate in a slot running circumferentially around the engine piston. Gases fed from the engine chamber to the gas bearing carrying the load on the seal block in the direction of piston travel. The seal block includes a gas accumulator cavity for gas storage. An orifice feeds gas from the gas accumulator cavity to the gas bearing interfacing between the seal block and the engine cylinder wall. The apparatus also includes a reaction piston having gas communicated thereto from the engine chamber.

7 Claims, 5 Drawing Sheets

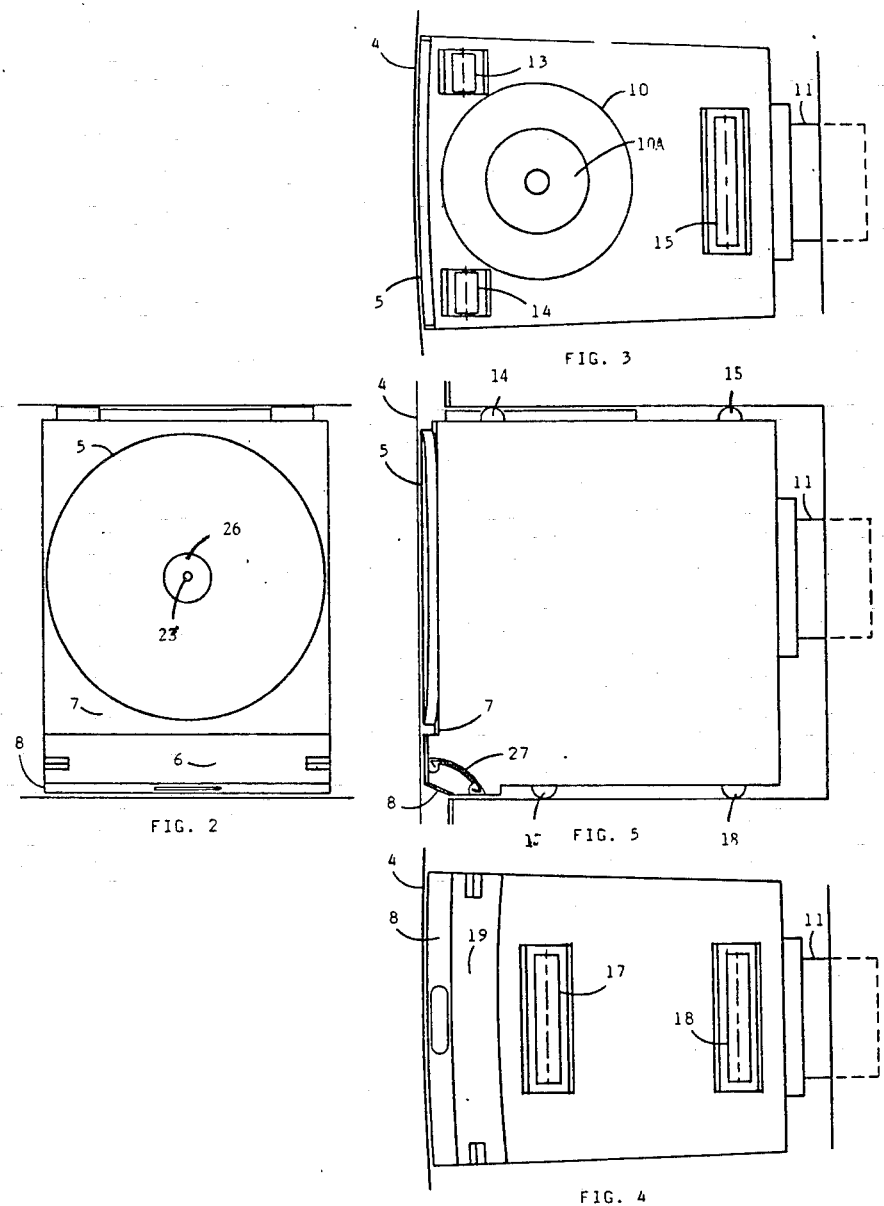

RECIPROCATING ENGINE PISTON SEAL

RELATED APPLICATION

The following U.S. patent application filed on an even date with the instant application is related to the instant application: POWER GENERATION APPARATUS, John W. Larson inventor, Ser. No. 047770, filed May 8, 1987.

BACKGROUND OF THE INVENTION

1. Field of the Invention

The present invention relates in general to reciprocating engine pistons and pertains, more particularly, to a system for sealing the gap between the piston and cylinder walls of such an engine. Even more particularly, the invention relates to a piston sealing system incorporating gas bearings to reduce friction and to achieve low fluid leakage between the piston and the engine cylinder wall.

2. Background Discussion

The means for sealing the gap between a piston and the cylindrical walls of a reciprocating engine generally consists of a set of piston rings lubricated by oil. With such an arrangement, both the piston and walls are maintained at a temperature sufficiently low that the desired lubricant properties are maintained. As a result, the low wall temperature, relative to the temperature of the gas working fluid contained in the engine chamber, leads to a significant loss of heat from the engine working fluid by heat transfer to the cooled piston and cylinder walls that significantly reduces the efficiency of energy conversion, by the engine combustion of fuel, to mechanical work.

Accordingly, a general objective of the present invention is to achieve a higher engine efficiency through the preferred elimination of oil lubricant and the use of engine working fluid to achieve the required piston seal function of preventing significant leakage of gas from the engine chamber past the piston while maintaining low resistance by the engine cylinder walls to the reciprocating movement of the piston.

With respect to known prior art, reference is now made herein to U.S. Pat. No. 2,884,282 to Sixsmith, as well as U.S. Pat. Nos. 4,413,864 and 4,496,194 to Phillips. In this connection, it is noted that a gas bearing comprised of a cavity on one of two interfacing surfaces, wherein a means is provided for gas, or air, to flow from a source to the cavity, and from there leak past the small gap around the edge of the cavity to in between the two interfacing surfaces, is well known. The Sixsmith patent illustrates the manner in which three such air bearings are applied to support a rotating solid cylindrical shaft.

In the Phillips patents there is described a gas bearing applied to a planer surface wherein one of the interfacing bodies contains a cavity into which air is supplied.

OBJECTS OF THE INVENTION

Accordingly, it is an object of the present invention to provide a means of sealing the gap between the piston and cylinder walls of an engine through the use of gas bearing supported sealing means.

Another object of the present invention is to provide a sealing means as in accordance with the preceding object and in which the sealing is provided by means of gas bearing supported sealing blocks.

Still a further object of the present invention is to provide piston sealing blocks incorporating gas bearings to reduce friction and to achieve low fluid leakage between the piston and the engine cylinder wall.

A further object of the present invention is to provide a means within the piston for accumulation of gas bearing working fluid during the engine cycle period of peak chamber pressure.

SUMMARY OF THE INVENTION

To accomplish the foregoing and other objects, features, and advantages of the invention, there is provided an apparatus or device for sealing the piston of an engine, preferably a reciprocating engine, such as a diesel engine or reciprocating compressor. The apparatus of the present invention seals the piston with the engine cylinder wall and carries this out by means of a plurality of separate seal blocks. The piston has means for receiving the seal blocks in an array disposed about the circumference of the piston. The seal blocks are received preferably in a circumferential slot at the lower end of the piston. Each of the seal blocks has a cylinder wall facing surface and also has means defining an internal gas accumulator chamber that is charged by engine gas during periods of peak engine chamber pressure. Means are provided forming a flow-restricted orifice coupling from the accumulator chamber to the cylinder wall facing surface of the seal block. Gas from the accumulator chamber couples through the orifice forming a gas bearing for maintaining a seal between the seal block and the engine cylinder wall. The apparatus may further include a second gas bearing at the interface between the top of the seal block and the piston. A gas passage couples inside of the seal block and includes a first passage segment coupling to a first cavity at the seal block top to which gas is coupled to form the second gas bearing. The gas passage also includes a second passage segment coupling to a second cavity in the seal block. Associated therewith is a reaction piston disposed at the inner side of the seal block for urging the seal block against the cylinder wall. The second cavity is disposed on one side of the reaction piston. Associated with the accumulator chamber is preferably a valve means coupling from the gas passage to the accumulator chamber for enabling charging of the accumulator chamber in particular during periods of peak engine chamber pressure.

BRIEF DESCRIPTION OF THE DRAWINGS

Numerous other objects, features, and advantages of the invention should now become apparent upon a reading of the following detailed description taken in conjunction with the accompanying drawings, in which:

FIG. 2 is a diagrammatic illustration of an external view of the seal block at the face thereof wherein the seal block interfaces with the engine cylinder wall;

FIG. 3 is a diagrammatic illustration of a further external view of the seal block at a top surface thereof;

FIG. 4 is a diagrammatic illustration of a further external view of the seal block at a bottom surface thereof;

FIG. 5 is a diagrammatic illustration of a further external view of the seal block at the side where it interfaces with an adjacent seal block;

DESCRIPTION OF THE PREFERRED EMBODIMENT

The invention is illustrated and described in terms of a reciprocating internal combustion engine that could operate either with spark ignition or with compression ignition. However, the invention is also applicable to reciprocating air compressors.

Figure 1:
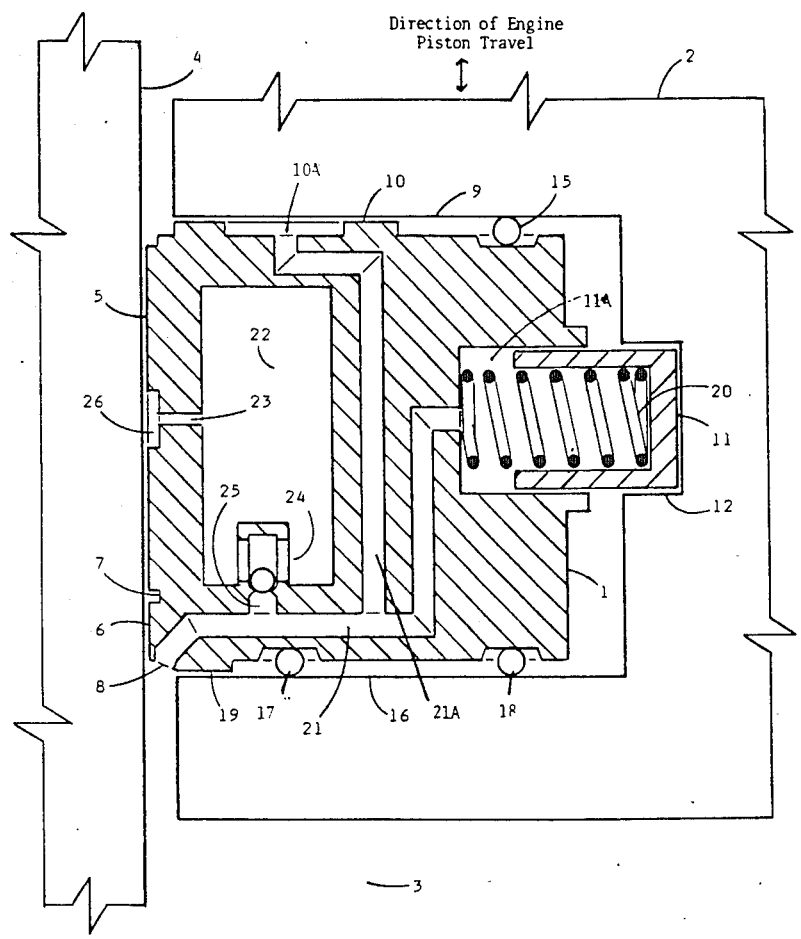
FIG. 1 is a diagrammatic illustration, partially in cross-section of a piston seal block.

Referring now to the drawings, FIG. 1 shows a cutaway view through the seal block 1 positioned in a cavity contained in engine piston body 2 and functioning to prevent leakage from engine chamber 3 between engine piston body 2 and engine cylinder wall 4. FIGS. 2 through 5 illustrate external views of the seal block.

FIG. 2 shows a view of the seal block at the face thereof taken from the cylinder wall 4 side. The seal block travels along cylinder wall 4 at a very small clearance and without physical contact due to the incorporation of gas bearing 5, the outline of which is illustrated in FIG. 2 and cutaway, in FIG. 1. This gas bearing maintains edge seal 6 shown in FIGS. 1 and 2 at a very small gap to prohibit significant leakage of gas from engine working chamber 3 past engine piston body 2 as shown in FIG. 1. Recessed surface 7 is provided to maintain uniform back pressure for proper functioning of air bearing 5.

Referring now to FIG. 1, the consequence of a high engine chamber pressure against seal surface 8 exposed directly to gas pressure in engine chamber 3 is a high load on seal block 1 in the direction of piston travel, reacting against piston body surface 9. This load is carried by gas bearing 10, which is necessary in order for seal block 1 to move in the radial direction back and forth relative to engine piston body 2, which in turn is necessary in order to maintain close distance to cylinder wall 4.

Seal block 1 is forced against cylinder wall 4 by means of reaction piston 11, which is positioned in cavity 12 contained in the piston body 2. The reaction piston 11 is designed to match the radial fluid forces caused by gas in engine chamber 3 against seal block edge 8 and seal surface 6, and by gas bearing 5.

The radial force applied by free piston 11 between seal block 1 and engine piston body 2 is complemented by mechanical spring 20. This radial position adjustment feature is an important element of the invention because it is expected that cylinder wall surface 4 will vary in separation distances with time from engine piston body 2 due to differential thermal expansion and deviate from perfect straightness as a manufacturing construction reality. In addition, mechanical spring 20 provides a radial force that is variable with seal block radial displacement relative to engine piston body 2 that maintains engine piston body 2 relatively centered in engine cylinder 4 in reaction to radial loads transmitted to the piston body by a piston connecting rod (not shown).

FIG. 3 shows the view of seal block 1 from the highly loaded engine piston reactive load surface 9. Gas bearing 10 is outlined. Roller bearings 13, 14, and 15 are also provided to maintain adequate clearance between seal block 1 and engine piston body 2 over the range of the engine cycle processes and to supplement and to back up gas bearing 10. These roller bearings are lightly loaded as compared to gas bearing 10.

FIG. 4 shows the view of seal block 1 from chamber-side piston riding surface 16, noted in FIG. 1. Roller bearings 17 and 18 are used to maintain proper position of seal block edge surface 19, also shown in FIG. 1, to significantly reduce leakage of gas from engine chamber 3 around this side of seal block 1, and yet permit radial movement of seal block 1 relative to engine piston body 2.

The supply of gas to service the gas bearings is provided from the engine chamber during the engine operation. This aspect of piston seal block operation will now be described.

Referring now to FIG. 1, the gas cavity 11A on the seal block side of reactive piston 11 and the cavity 10A for vertical-load gas bearing 10 communicate directly with engine chamber 3 by means of passage 21. This passage arrangement matches both the vertical and radial forces between seal block 1 and engine piston body 2 to the forces applied on the seal block by the engine chamber fluid wich occurs at surfaces 6, 8, and 19, as well as balancing all rotational moments due to these direct and other previously identified reactive forces. In particular, the gas flowing in passage 21 to chamber 11A forces the seal block 1 into intimate contact with the cylinder wall 4.

The cylinder wall-riding-gas bearing 5 functions from gas stored in gas accumulator chamber 22, which is replenished during the period of peak engine chamber pressure. A choked-flow orifice 23 maintains a controlled flow of gas to gas bearing 5. Gas from chamber 22 flows through passage 23 to reach seal inner cavity chamber 26. From gas bearing cavity 26, the gas flows between the surface of bearing 5 and wall 4 to an exhaust on the side of the piston opposite the engine chamber. The capture and retention of gas from chamber 22 is achieved through use of check valve 24 in passage 25 via passage 21.

FIG. 5 shows a view of the seal block from an adjacent seal block. The seal blocks fit closely together around the circumference of the piston. The leakage of chamber fluid between the seal blocks is restricted by mechanical seal 27, which runs from cylinder wall surface seal 6 to lower piston wall surface 19. The mechanical seal 27 may in many cases be omitted with a small loss in engine performance.

Figure 7:
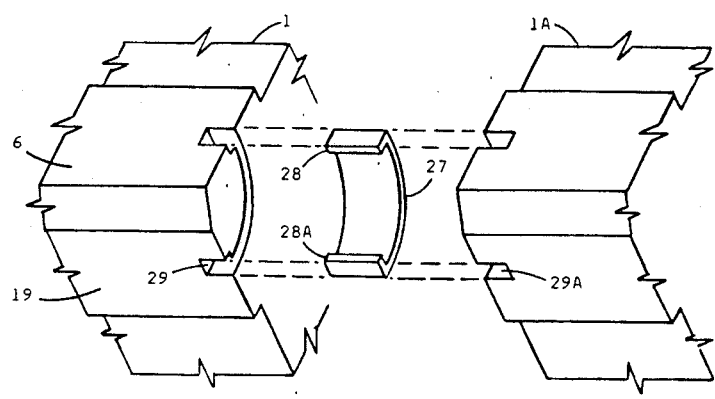
FIG. 7 is a diagrammatic illustration of the mechanical seal that restricts gas leakage through the gap between the seal blocks.

FIG. 7 illustrates the configuration of mechanical seal 27 in more detail. Edge seal surfaces 6 and 19 are noted. Mechanical seal 27, shown separated from the two seal blocks, is shaped as a segment of a cylindrical shell with thickened edges 28 and 28A. Seal blocks 1 and 1A contain cavities 29 and 29A sized to accommodate insertion of mechanical seal 27. When mechanical seal 27 is inserted into seal blocks 1 and 1A and the two seal blocks are placed together, gas leakage from its engine chamber to the gap between the seal blocks is substantially reduced.

Figure 6:
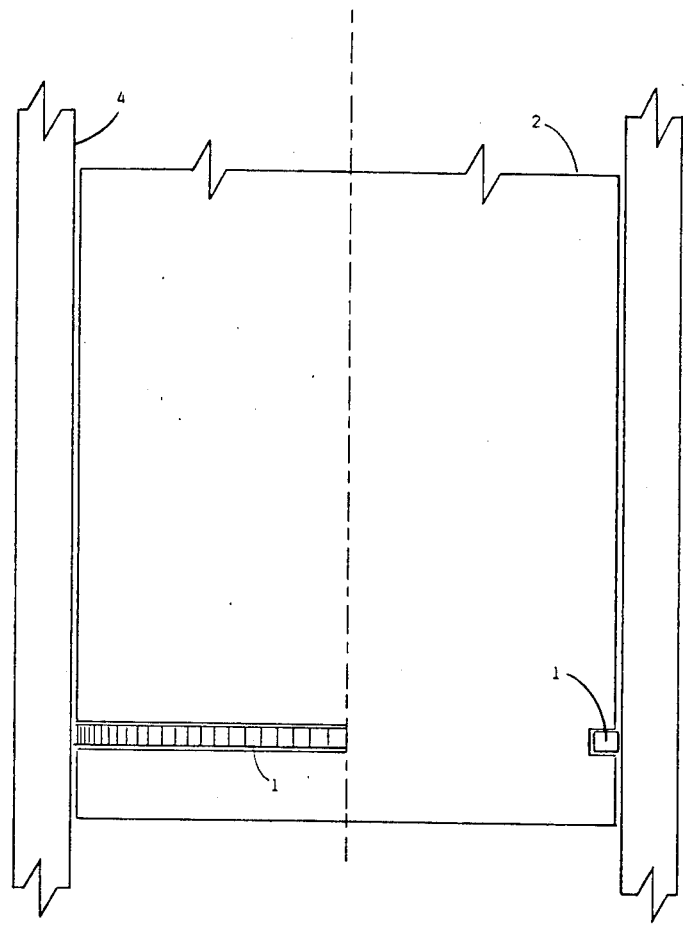
FIG. 6 is a diagrammatic illustration of the engine piston containing a plurality of seal blocks within a piston slot.

FIG. 6 illustrates the engine piston concept of the present invention showing an external view on the left and a center section on the right. As indicated previously, the seal blocks fit closely together around the circumference of the piston. As previously stated, the piston travels in reciprocating motion in the cylindrical vessel 4. The escape of gas from the engine chamber past the piston is restricted by the lower-disposed piston seal blocks 1. The sealing function is achieved through the use of many seal blocks arranged to travel in seal tracks running around the piston. These seal blocks travel on a thin gas film on all high loading interfaces, and travel on lightly loaded roller bearings on all low loading interfaces. With reference to FIG. 1, the high loading interface is at the top surface of the seal block at the gas bearing 10 and also is, of course, at the gas bearing 5.

In operation, and assuming that the engine piston 2 is travelling upwardly under pressure within chamber 3, the pressurized gas enters the opening in seal block surface 8 and flows into fluid passage 21. A portion of the gas flows from passage 21 through passage 21A into cavity 10A of gas bearing 10, and from cavity 10A the gas flows between gas bearing surface 10 and engine piston face 9 to the backside of the engine piston. A slight movement of seal block 1 towards engine piston surface 9 causes the average pressure between gas bearing surface 10 and engine piston surface 9 to increase, yielding an increase in downwardly applied force against seal block 1; conversely, a slight movement of seal block 1 away from engine piston surface 9 causes the average pressure at the gas bearing 10 to engine piston 9 interface to decrease, yielding a decreased downwardly applied force. Consequently, the seal block 1 will locate at a distance from engine piston surface 9 that exactly matches the force due to gas pressure applied to seal block 1 against gas bearing surfaces 10 and 10A to the forces on seal block 1 in the opposite direction applied by pressurized gas from engine chamber 3 against surface 8 and 19 of seal block 1.

Referring to FIG. 1, gas also couples by way of the passage 25 and valve 24 for recharging the accumulator chamber 22. Another portion of gas flows from passage 21 through passage 25 and valve 24 into chamber 22 during the period that the gas pressure in engine chamber 3 exceeds the gas pressure in chamber 22. Valve 24 automatically closes when the accumulator chamber pressure exceeds the engine chamber pressure. The outlet orifice 23 from the chamber provides a gas bearing at 5 in FIG. 1, as previously described.

Gas under pressure is also coupled by way of passage 21 to cavity 11A for operating the piston 11 so as to urge the seal block toward and in close contact with engine cylinder wall 4. The spring 20 also operates in an expansion mode to assist in urging the seal block toward the cylinder wall.

The applied force due to pressure of the gas contained in the interface between the surface of gas bearing 5 and cylinder wall 4 to seal block 1 varies approximately with the clearance distance "z" between these two surfaces 4 and 5 raised to the $-1.5$ exponent, that is, force varies approximately as $1/z^{1.5}$. The applied force due to pressure of the gas contained in the interface between seal block surface 6 and cylinder wall 4 increases slightly with decreasing clearance distance "z". The radial component of the force due to gas pressure against seal block surface 8 holds constant with seal block to cylinder wall clearance distance. Also, the radial force applied by reaction piston 11 between engine piston 2 and seal block 1 holds constant with outward and inward movement of seal block 1 relative to engine piston 2. Mechanical spring 20 functions in a compressive mode to apply a force of repulsion between seal block 1 and engine piston 2 that decreases and increases with movement of seal block 1 radially outwardly and inwardly, respectively, from the engine piston 2.

Thus, in the general design specification of the seal block apparatus, the reaction piston 11 is sized to approximately equal in applied force the radial loads applied against seal block 1 by gas pressure forces against seal block surfaces 6 and 8. Mechanical spring 11 is sized to match the nominal design load against seal block 1 by gas pressure forces against seal block surfaces of gas bearing 5. Thus, over the entire engine cycle operation, the radial force components are balanced by variations in the clearance "z" between seal block 1 and cylinder wall 4. In addition, the engine piston 2 is approximately centered in engine cylinder 4 due to the combined response of all mechanical springs 11 acting in seal blocks 1 around the entire circumference of the engine piston 2.

The upward movement of the engine piston 2 in engine cylinder 4 ceases when the engine stroke reaches its limit and the engine expansion process has been completed. At this point forces due to gas pressure in engine chamber 3 against seal block surfaces 6, 8 and 19 are negligible. Also, the forces applied against the seal block 1 by gas bearing 10 and reaction piston 11 are negligible. When this situation occurs, roller bearings 13, 14, and 15 shown in FIG. 3, plus roller bearings 17 and 18 shown in FIG. 4, provide proper vertical positioning of seal block 1 in piston 2 and accommodate outwardly and inwardly movement of seal block 1 relative to piston 2.

At the time when the engine expansion process has been completed, significant gas remains in accumulator cavity 22 at sufficient pressure to continue proper functioning of gas bearing 5. The seal block 1 will position between engine piston 2 and cylinder wall 4 at the location where the forces applied on seal block 1 by gas bearing 5 and mechanical spring 20 are approximately equal.

The seal block 1 operates during the downward movement of the piston in a similar manner as during upward movement. Gas bearing 5 continues to function by means of the remaining gas contained in accumulator cavity 22. When the pressure of the gas contained in engine chamber 3 exceeds the pressure of the gas in accumulator cavity 22, valve 24 opens to admit a new charge of engine chamber gas. The operating process then repeats as described above.

Figure 10:
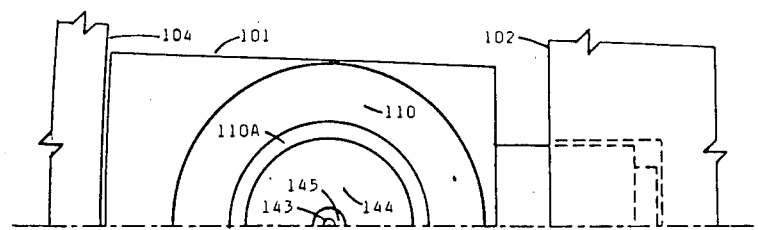
FIG. 10 is a diagrammatic illustration of a further external view of the alternative seal block at a bottom surface thereof.
Figure 8:
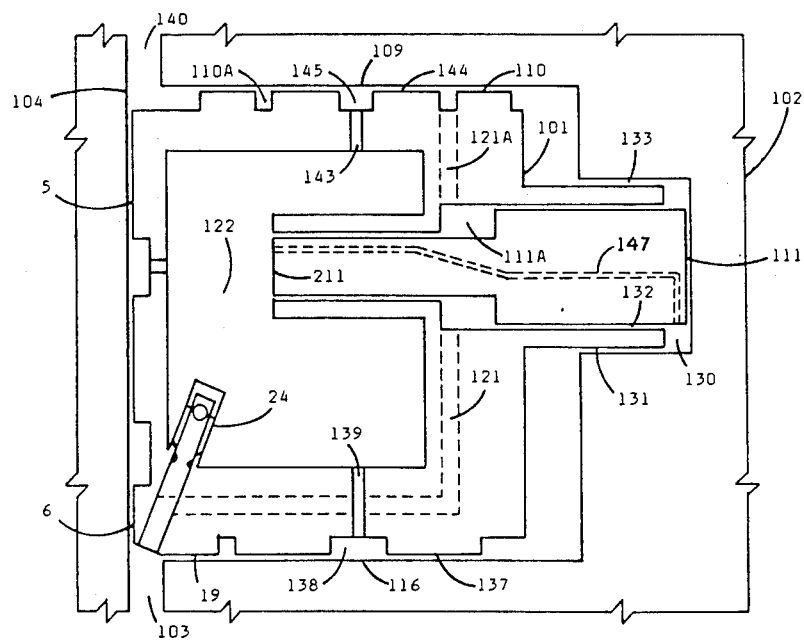
FIG. 8 is a diagrammatic illustration, partially in cross-section of an alternative piston seal block.
Figure 9:
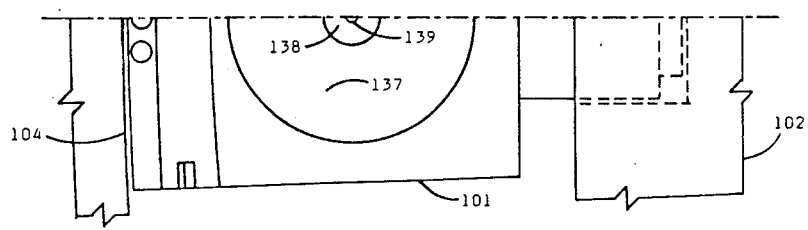
FIG. 9 is a diagrammatic illustration of an external view of the alternative seal block at a top surface thereof.

An alternative configuration of a seal block system utilizing the above features, is illustrated in FIGS. 8, 9 and 10. This alternative seal block differs from the seal block illustrated in FIGS. 1 through 5 in that roller bearings are replaced by additional gas bearings and the combination of simple reaction piston and mechanical spring is replaced by the combination of a compound reaction piston and gas spring. Those features of the alternative seal block configuration similar to those of the previously described seal block configuration will be noted, and those features that are different will be described.

Referring to FIG. 8, the compound reaction pistons 111 and 211 replace simple reaction piston 11 shown in FIG. 1. The compound reaction pistons 111 and 211 interface with chamber 111A wherein gas couples chamber 111A by way of passage 121 with engine chamber 103 in the same way as that described for FIG. 1 where chamber 11A couples by way of passage 21 with engine chamber 3. In addition, FIG. 8 shows the coupling of the second reaction piston 211 to reaction piston 111. The end of reaction piston 211 is loaded by the pressure of gas contained in accumulator chamber 122. In addition, FIG. 8 shows a tubular-shaped extension 131 of seal block 101 inserted into cavity 110 of engine piston 102. The void space between compound reaction piston 111, engine piston 102 and seal block tubular extension 131 functions in the manner of a gas spring replacing the mechanical spring 20 shown in FIG. 1. The cavity comprising gas spring 130 couples with gas accumulator 122 by means of passage 147. The gas spring 130 functions with a gas pressure less than half of the gas pressure in gas accumulator 122. Thus, passage 147 contains a choked-flow orifice that holds gas flow rate constant from gas accumulator 122 to gas spring 130.

During the period when the gas pressure in engine chamber 103 exceeds the gas pressure in cavity 130, gas seeps from cavity 111A through the clearance 132 between compound reaction piston 111 and seal block tubular extension 131 to gas spring cavity 130. The gas flow reverses direction in this passage when the gas pressure in engine chamber 103 is lower than the gas pressure in gas spring chamber 130. In addition, gas seeps continuously from gas spring chamber 130 through the clearance 133 between seal block tubular extension 131 and engine piston 102 to the back side of the pistion at 140. In operation, compound reaction piston 111 butts continuously against engine piston 102, and seal block 101 moves radially ouward and inward to balance forces on seal block 101 as described previously in relation to FIG. 1. The purpose of secondary reaction piston 211 is to improve balance of forces in the radial direction acting on the seal block 101 with less variation in clearance between seal block 101 and cylinder wall 104 over the engine cycle than would otherwise occur.

The purpose of employing a gas spring as shown in FIG. 8 over a mechanical spring as shown in FIG. 1 is to achieve a more convenient engine assembly procedure for installing the piston with seal blocks into the engine cylinder. In the case of the seal block configuration shown in FIG. 1, means have to be provided during engine assembly and piston installation to sufficiently compress the mechanical spring so that the clearance between seal blocks and cylinder wall is adequate for piston insertion. Gas springs as illustrated in FIG. 8 accommodate full recess of seal blocks into the piston for convenient mechanical assembly of the piston into the engine cylinder. These gas springs become effective for loading the seal blocks against the engine cylindrical walls only after cavity 130 is charged with gas, which follows the first cycle of engine operation.

FIGS. 8 and 9 show gas bearing 137 with cavity 138 that replaces roller bearings 17 and 18 shown in FIG. 4. Gas couples by way of choked orifice 139 to control flow of gas from accumulator chamber 122 to gas bearing cavity 138, after which the gas flows between gas bearing surface 137 and piston guide face 116, and from there around the seal blocks to the back side of the piston 140. Gas bearing 137 functions with interface repulsive force increasing with decreasing bearing clearance as described earlier for gas bearing 5 shown in FIG. 1.

FIGS. 8 and 10 show gas bearing 144 with cavity 145 that replaces roller bearings 13, 14 and 15 shown in FIG. 2. Gas couples by way of choked orifice 143 to control flow of gas from accumulator chamber 122 to gas bearing cavity 145, after which the gas flows between gas bearing surface 144 and piston guide face 109 into cavity 110A, under the situation where gas pressure in cavity 110A is lower than the gas pressure in accumulator chamber 122. A reversal of the pressure relationship between cavity 110A and chamber 122 leads to flow of gas from cavity 110A couples with engine chamber 103 by way of passage 121A and 121 with low resistance to flow.

Thus, the direction of flow across gas bearing 144 is from the higher pressure to the lower pressure levels of gas contained in cavities 145 and 110A. Gas bearing 110 functions in the same manner as gas bearing 10 shown in FIG. 1 and described earlier. Referring to FIG. 8, gas bearing 110 provides the dominant load when gas pressure in the engine chamber 103 is greater than gas pressure in the seal block gas accumulator 122; gas bearing 144 provides the dominant load under the reverse gas pressure relationship.

Edge sealing achieved by surfaces 6 and 19 are as described for FIG. 1. Gas bearing 5 and valve 24 also function as described for FIG. 1.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. Apparatus for sealing the piston of an engine with an engine cylinder wall, said apparatus comprising; a plurality of separate seal blocks, said engine piston having means for receiving said seal blocks in an array disposed about the circumference of the engine piston, each said seal block having a cylinder wall facing surface and means defining an internal gas accumulator chamber that is charged by engine gas during periods of peak engine chamber pressure, means forming a flow-restricted orifice coupling from said accumulator chamber to said cylinder wall facing surface of the seal block, gas from said accumulator chamber coupled through said orifice forming a gas bearing for maintaining a seal between the seal block and engine cylinder wall said means for receiving said seal blocks includes a circumferential slot about the engine piston for receiving the seal blocks in a close-coupled array further including means forming a second gas bearing at the interface between the top of the seal block and the engine piston further including a gas passage coupling inside of said seal block and including a first passage segment coupling to a first cavity at the seal block top to which gas is coupled to form said second gas bearing said gas passage including also a second passage segment coupling to a second cavity in the seal block, and further including a reaction piston disposed at the inner side of the seal block for urging the seal block against the cylinder wall, said second cavity disposed on one side of said reaction piston.

2. Apparatus as set forth in claim 1 including a spring associated with said reaction piston to force the reaction piston to an expanded position.

3. Apparatus as set forth in claim 2 further including a valve means coupling from said gas passage to said accumulator chamber for enabling charging of said accumulator chamber.

4. Apparatus for sealing the piston of an engine with an engine cylinder wall, said apparatus comprising; a plurality of separate seal blocks, said engine piston having means for receiving said seal blocks in an array disposed about the circumference of the engine piston, each said seal block having a cylinder wall facing surface and means defining an internal gas accumulator chamber that is charged by engine gas during periods of peak engine chamber pressure, means forming a flow-restricted orifice coupling from said accumulator chamber to said cylinder wall facing surface of the seal block, gas from said accumulator chamber coupled through said orifice forming a gas bearing for maintaining a seal between the seal block and engine cylinder wall said means for receiving said seal blocks includes a circumferential slot about the engine piston for receiving the seal blocks in a close-coupled array, and further including mechanical support bearing means disposed on at least one of the top and bottom interface surfaces with the engine piston.

5. Apparatus for sealing the piston of an engine with an engine cylinder wall, said apparatus comprising; a plurality of separate seal blocks, said engine piston having means for receiving said seal blocks in an array disposed about the circumference of the engine piston, each said seal block having a cylinder wall facing surface and means defining an internal gas accumulator chamber that is charged by engine gas during periods of peak engine chamber pressure, means forming a flow-restricted orifice coupling from said accumulator chamber to said cylinder wall facing surface of the seal block, gas from said accumulator chamber coupled through said orifice forming a gas bearing for maintaining a seal between the seal block and engine cylinder wall said means for receiving said seal blocks includes a circumferential slot about the engine piston for receiving the seal blocks in a close-coupled array including passage means inside of said seal block for coupling to said accumulator chamber, and a reaction piston disposed in the engine piston slot on the inside of the seal block, said reaction piston also operative from said passage means.

6. Apparatus for sealing the piston of an engine with an engine cylinder wall, said apparatus comprising; a plurality of separate seal blocks, said engine piston having means for receiving said seal blocks in an array disposed about the circumference of the engine piston, each said seal block having a cylinder wall facing surface and means defining an internal gas accumulator chamber that is charged by engine gas during periods of peak engine chamber pressure, means forming a flow-restricted orifice coupling from said accumulator chamber to said cylinder wall facing surface of the seal block, gas from said accumulator chamber coupled through said orifice forming a gas bearing for maintaining a seal between the seal block and engine cylinder wall, including means on said seal block defining upper and lower gas bearings interfacing, respectively, between the top and bottom of the seal block and the engine piston, including second and third orifices from said gas accumulator to said respective upper and lower gas bearings, including a reaction piston disposed between the seal block and the engine piston to react the radial force on the seal block by both the engine-chamber-pressure force and engine-cylinder-wall gas bearing.

7. Apparatus for sealing the piston of an engine with an engine cylinder wall, said apparatus comprising; a plurality of separate seal blocks, said engine piston having means for receiving said seal blocks in an array disposed about the circumference of the engine piston, each said seal block having a cylinder wall facing surface and means defining an internal gas accumulator chamber that is charged by engine gas during periods of peak engine chamber pressure, means forming a flow-restricted orifice coupling from said accumulator chamber to said cylinder wall facing surface of the seal block, gas from said accumulator chamber coupled through said orifice forming a gas bearing for maintaining a seal between the seal block and engine cylinder wall, including a reaction piston disposed between the seal block and the engine piston to react the radial force on the seal block by both the engine-chamber-pressure force and engine-cylinder-wall gas bearing

* * * * *